(12) United States Patent
Tung et al.

(10) Patent No.: US 7,576,015 B2
(45) Date of Patent: Aug. 18, 2009

(54) METHODS FOR MANUFACTURING ALIGNMENT LAYER, ACTIVE DEVICE ARRAY SUBSTRATE AND COLOR FILTER SUBSTRATE

(75) Inventors: Yuan-Hung Tung, Taoyuan (TW); Chih-Jui Pan, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 163 days.

(21) Appl. No.: 11/533,724

(22) Filed: Sep. 20, 2006

(65) Prior Publication Data

US 2007/0222929 A1 Sep. 27, 2007

(30) Foreign Application Priority Data

Mar. 27, 2006 (TW) .............................. 95110499 A

(51) Int. Cl.
*H01L 21/31* (2006.01)
(52) U.S. Cl. ........................ 438/780; 438/760; 438/763; 438/764; 438/765; 438/778; 438/781; 438/FOR. 363; 257/643; 257/792; 257/E21.016; 257/E21.019
(58) Field of Classification Search ................. 438/760, 438/763, 764, 765, 778, 780, 781, FOR. 363; 257/643, 792, E21.016, E21.019
See application file for complete search history.

(56) References Cited

U.S. PATENT DOCUMENTS

| 5,447,759 | A | * | 9/1995 | Murata et al. ............... 428/1.26 |
| 5,654,780 | A | * | 8/1997 | Hasegawa et al. ........... 349/136 |
| 2005/0271833 | A1 | * | 12/2005 | Matsumori et al. ......... 428/1.25 |

FOREIGN PATENT DOCUMENTS

JP 09-105937 4/1997

OTHER PUBLICATIONS

"Solubility", Wikipedia, the Free Encyclopedia.*

* cited by examiner

*Primary Examiner*—Thanh V Pham
(74) *Attorney, Agent, or Firm*—J.C. Patents

(57) ABSTRACT

A method for manufacturing an alignment layer is provided, which includes the following steps. First, a substrate is provided. Next, an auxiliary layer is formed on the substrate. Then, an alignment solution is sprayed on the auxiliary layer through an inkjet printing process. The alignment solution includes an alignment material and a first solvent, and the auxiliary layer has the same polarity as the first solvent. Then, by performing a curing process, the alignment solution is cured to form an alignment layer. As mentioned above, the method for manufacturing an alignment layer may be applied to manufacture an alignment layer with preferred smoothness.

23 Claims, 6 Drawing Sheets

METHODS FOR MANUFACTURING ALIGNMENT LAYER, ACTIVE DEVICE ARRAY SUBSTRATE AND COLOR FILTER SUBSTRATE

CROSS-REFERENCE TO RELATED APPLICATION

This application claims the priority benefit of Taiwan application serial no. 95110499, filed on Mar. 27, 2006. All disclosure of the Taiwan application is incorporated herein by reference.

BACKGROUND OF THE INVENTION

1. Field of the Invention

The present invention relates to a method for manufacturing an alignment layer, an active device array substrate and a color filter substrate, and more particularly to a method for manufacturing an alignment layer with better smoothness, an active device array substrate and a color filter substrate capable of enhancing the display quality of a liquid crystal display panel.

2. Description of the Related Art

Due to the progress of semiconductor devices and display devices, multimedia technology has become quite advanced. As far as the display is concerned, the liquid crystal display (LCD) with advantages such as having high resolution, high space-utilization efficiency, low power consumption, and being free of radiation, has gradually become the mainstream of the market. Generally, the liquid crystal panel is formed by two substrates and a liquid crystal layer sandwiched therebetween. No matter whether an active matrix LCD or passive matrix LCD, an alignment layer is required to be provided on the two substrates, which is mainly used to align liquid crystal molecules to make them in a certain arrangement between the two substrates.

Generally, after completing a pixel array or a color filter array, an alignment layer is further formed on the pixel array or the color filter array. As for the medium or small substrate, the method for forming the alignment layer is utilizing the alignment layer coating technique (PI coater) to transfer the alignment material onto the surface of the substrate, then performing a curing process to form an alignment layer. However, as the substrate becomes increasingly large, if the alignment layer is manufactured through the alignment layer coating technique, the thickness for each region of the alignment layer is different, i.e., the accuracy of the layer thickness is poor. Also, manufacturing the alignment layer through the coating technique consumes a lot of alignment material, leading an increase of the manufacturing cost. Moreover, the table for coating the alignment layer has a relatively great volume and occupies a relatively large space.

In order to solve the above problems, an inkjet printing technique is developed, wherein the alignment material is sprayed and printed old the surface of the substrate, and an alignment layer is formed after the alignment material is diffused and cured. However, since the surface of the substrate itself is not smooth, the extent of diffusion for the alignment material at different regions is different, resulting in a poor smoothness of the alignment layer. Thus, the displaying quality of the liquid crystal display panel is influenced.

SUMMARY OF THE INVENTION

Accordingly, an object of the present invention is to provide a method for manufacturing an alignment layer, which is used to manufacture an alignment layer with preferred smoothness.

Another object of the present invention is to provide a method for manufacturing an active device array substrate, which is used to manufacture an active device array substrate capable of enhancing the displaying quality of the liquid crystal display panel.

Still another object of the present invention is to provide a method for manufacturing a color filter substrate, which is used to manufacture a color filter substrate capable of enhancing the displaying quality of the liquid crystal display panel.

In order to achieve the above or other objects, the present invention provides a method for manufacturing an alignment layer, which includes the following steps. First, a substrate is provided. Next, an auxiliary layer is formed on the substrate. Then, an alignment material solution is sprayed on the auxiliary layer through an inkjet printing process, wherein the alignment material solution includes an alignment material and a first solvent, and the auxiliary layer has the same polarity as the first solvent. Then, the alignment material solution is cured by a curing process to form an alignment layer.

According to an embodiment of the present invention, in a method for manufacturing an alignment layer, the material of the first solvent is one selected from the group consisting of r-Butyrolactone (r-BL), Butyl Cellosolve (BC), Dipropylene Glycol Monomethyl Ether (DPM), N-Methyl-2-pyrrolidone (NMP), and any combination thereof, or other suitable solvents.

According to an embodiment of the present invention, in the method for manufacturing an alignment layer, the material of the above auxiliary layer is one selected from the group consisting of r-BL, BC, DPM, NMP, and any combination thereof, or other suitable solvents.

According to an embodiment of the present invention, in the method for manufacturing an alignment layer, the above auxiliary layer is a material layer made of a single material.

According to an embodiment of the present invention, in the method for manufacturing an alignment layer, the above auxiliary layer is a material layer made of multiple materials. By way of example, and not as a limitation, the weight ratio of r-BL, BC, DPM and NMP is a+b+c+d, and a+b+c+d=100, $0 \leq a \leq 100$, $0 \leq b \leq 100$, $0 \leq c \leq 100$, $0 \leq d \leq 100$, where (b+c):(a+d)=30:70 or below, and preferably (b+c):(a+d)=20:80 or below.

According to an embodiment of the present invention, in the method for manufacturing an alignment layer, the method for forming the auxiliary layer includes spin coating or inkjet printing.

According to an embodiment of the present invention, in the method for manufacturing an alignment layer, the thickness of the auxiliary layer falls within the range of 10 Å to 5 µm, for example.

According to an embodiment of the present invention, in the method for manufacturing an alignment layer, the thickness of the auxiliary layer falls within the range of 100 Å to 1 µm, for example.

The present invention further provides a method for manufacturing an active device array substrate, which includes the following steps. First, a substrate is provided. Next, a pixel array is formed on the substrate. Then, an auxiliary layer is formed on the pixel array. Then, an alignment material solution is sprayed on the auxiliary layer through an inkjet printing process, wherein the alignment material solution includes an alignment material and a first solvent, and the auxiliary layer has the same polarity as the first solvent. Then, the alignment material solution is cured by a curing process to form an alignment layer.

According to an embodiment of the present invention, in the method for manufacturing an active device array substrate, the material of the first solvent is one selected from the group consisting of r-BL, BC, DPM, NMP, and any combination thereof, or other suitable solvents.

According to an embodiment of the present invention, in the method for manufacturing an active device array substrate, the material of the above auxiliary layer is one selected from the group consisting of r-BL, BC, DPM, NMP, and any combination thereof, or other suitable solvents.

According to an embodiment of the present invention, in the method for manufacturing an active device array substrate, the above auxiliary layer is a material layer made of a single material.

According to an embodiment of the present invention, in the method for manufacturing an active device array substrate, the above auxiliary layer is a material layer made of multiple materials. By way of example, and not as a limitation, the weight ratio of r-BL, BC, DPM and NMP is a:b:c:d, and a+b+c+d=100, $0 \leq a \leq 100$, $0 \leq b \leq 100$, $0 \leq c \leq 100$, $0 \leq d \leq 100$, where (b+c):(a+d)=30:70 or below, and preferably (b+c):(a+d)=20:80 or below.

According to an embodiment of the present invention, in the method for manufacturing an active device array substrate, the method for forming the auxiliary layer includes spin coating or inkjet printing.

According to an embodiment of the present invention, in the method for manufacturing an active device array substrate, the thickness of the auxiliary layer falls within the range of 10 Å to 5 μm, for example.

According to an embodiment of the present invention, in the method for manufacturing an active device array substrate, the thickness of the auxiliary layer falls within the range of 100 Å to 1 μm, for example.

The present invention further provides a method for manufacturing a color filter substrate, which includes the following steps. First, a substrate is provided. Next, a color filter array is formed on the substrate. Then, an auxiliary layer is formed on the color filter array. Then, an alignment material solution is sprayed on the auxiliary layer through an inkjet printing process, wherein the alignment material solution includes an alignment material and a first solvent, and the auxiliary layer has the same polarity as the first solvent. Then, the alignment material solution is cured by a curing process to form an alignment layer.

According to an embodiment of the present invention, in the method for manufacturing a color filter substrate, the material of the first solvent is one selected from the group consisting of r-BL, BC, DPM, NMP, and any combination thereof, or other suitable solvents.

According to an embodiment of the present invention, in the method for manufacturing a color filter substrate, the material of the above auxiliary layer is one selected from the group consisting of r-BL, BC, DPM, NMP, and any combination thereof, or other suitable solvents.

According to an embodiment of the present invention, in the method for manufacturing a color filter substrate, the above auxiliary layer is a material layer made of a single material.

According to an embodiment of the present invention, in the method for manufacturing a color filter substrate, the above auxiliary layer is a material layer made of multiple materials. By way of example, and not as a limitation, the weight ratio of r-BL, BC, DPM and NMP is a:b:c:d, and a+b+c+d=100, $0 \leq a \leq 100$, $0 \leq b \leq 100$, $0 \leq c \leq 100$, $0 \leq d \leq 100$, where (b+c):(a+d)=30:70 or below, and preferably (b+c):(a+d)=20:80 or below.

According to an embodiment of the present invention, in the method for manufacturing a color filter substrate, the method for forming the auxiliary layer includes spin coating or inkjet printing.

According to an embodiment of the present invention, in the method for manufacturing a color filter substrate, the thickness of the auxiliary layer falls within the range of 10 Å to 5 μm, for example.

According to an embodiment of the present invention, in the method for manufacturing a color filter substrate, the thickness of the auxiliary layer falls within the range of 100 Å to 1 μm, for example.

In the methods for manufacturing the alignment layer, the active device array substrate and the color filter substrate provided by in the present invention, an auxiliary layer is first formed before the alignment layer has been formed, such that the alignment material solution sprayed on the auxiliary layer diffuses on a relatively smooth surface, and thereby forming an alignment layer with preferred smoothness. The liquid crystal display panel assembled by the active device array substrate and the color filter substrate manufactured through the above method have a preferred display quality.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention, where.

DESCRIPTION OF EMBODIMENTS

Figure 1A:
FIGS. 1A to 1D show a flow chart of a method for manufacturing an alignment layer according to an embodiment of the present invention.

FIGS. 1A to 1D show a flow chart of a method for manufacturing an alignment layer according to an embodiment of the present invention. Referring to FIG. 1A, the method for manufacturing the alignment layer includes providing a substrate 110 first. The substrate 110 is, for example, a glass substrate, a quartz substrate, or substrates made of other suitable materials.

Figure 1B:
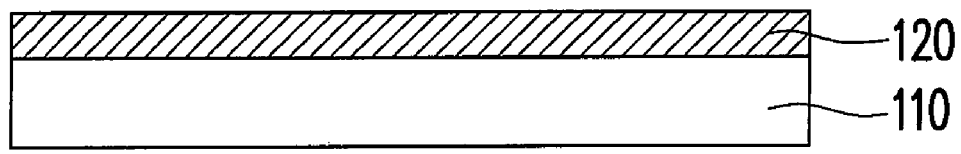

Referring to FIG. 1B, an auxiliary layer 120 is then formed on the substrate 110 and the method for forming the auxiliary layer 120 is, for example, spin coating or inkjet printing. The material of the formed auxiliary layer 120 is, for example, one selected from the group consisting of r-Butyrolactone (r-BL), Butyl Cellosolve (BC), Dipropylene Glycol Monomethyl Ether (DPM), N-Methyl-2-pyrrolidone (NMP), and any combination thereof, or other suitable material. The thickness of the auxiliary layer 120 falls within the range of, for example, 10 Å to 5 µm, preferably within the range of 100 Å to 1 µm. It should be noted that the auxiliary layer 120 is, for example, a material layer made of a single material or a material layer made of multiple materials. For example, the weight ratio of r-BL, BC, DPM and NMP is a:b:c:d, and a+b+c+d=100, $0 \leq a \leq 100$, $0 \leq b \leq 100$, $0 \leq c \leq 100$, $0 \leq d \leq 100$. In a preferred embodiment, the mixing proportion is approximately below (b+c):(a+d)=30:70, i.e., the ratio of (b+c) is not over 30%; and more preferably below (b+c):(a+d)=20:80.

Figure 1C:
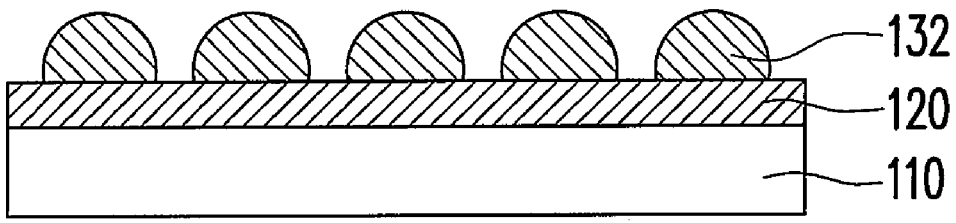

Referring to FIG. 1C, an alignment material solution 132 is then sprayed on the auxiliary layer 120 through an inkjet printing process. The alignment material solution 132 includes an alignment material and a first solvent, and the auxiliary layer 120 has the same polarity as the first solvent. The material of the first solvent is, for example, one selected from the group consisting of r-BL, BC, DPM, NMP, and any combination thereof, or other suitable material. In a preferred embodiment, the first solvent and the auxiliary layer 120 are, for example, of the same solvent. After being sprayed through the inkjet printing process, the alignment material solution 132 will diffuse so as to form a liquid film layer.

Figure 1D:
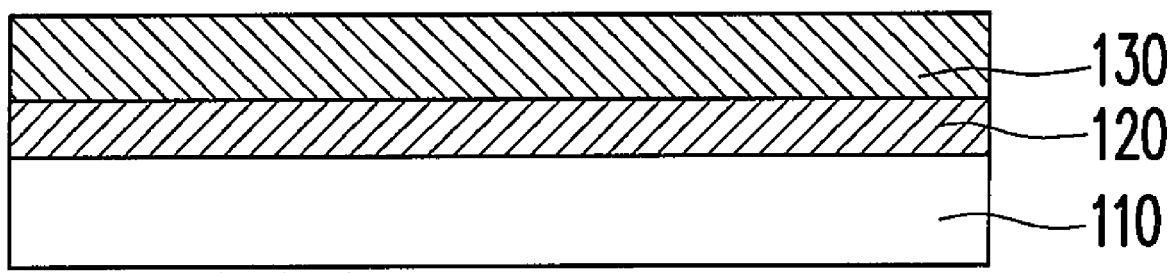

Referring to FIG. 1D, by performing a curing process, the alignment material solution 132 is cured to form an alignment layer 130. The curing process is, for example, a heat curing process, UV curing process, or other suitable curing process.

It should be noted that since an auxiliary layer 120 has already been formed on the substrate 110 before forming the alignment layer 130, even though the smoothness of the surface of the substrate 110 is poor, the recesses on a part of the substrate are filled after the auxiliary layer 120 has been formed. Therefore, the alignment material solution 132 sprayed onto the auxiliary layer 120 diffuses on a relatively smooth surface, thus forming an alignment layer 130 with preferred smoothness.

It should be noted that the method for forming the auxiliary layer 120 is spin coating in this embodiment; however, the method is not limited to spin coating. In another embodiment, the method for forming the auxiliary layer 120 also can be inkjet printing.

The above method for manufacturing the alignment layer may be used to manufacture an alignment layer 130 with preferred smoothness. If an active device array substrate or a color filter substrate has an alignment layer with preferred smoothness, the liquid crystal display panel assembled by the active device array substrate or the color filter substrate has a preferred display quality. The method for manufacturing the active device array substrate and the method for manufacturing the color filter substrate are respectively described herein below.

Figure 2A:
FIGS. 2A to 2E show a flow chart of a method for manufacturing an active device array substrate according to an embodiment of the present invention.

FIGS. 2A to 2E show a flow chart of a method for manufacturing an active device array substrate according to an embodiment of the present invention. Referring to FIG. 2A first, the method for manufacturing the active device array substrate includes providing a substrate 110 first. The substrate 110 is the same as that described above.

Figure 2B:
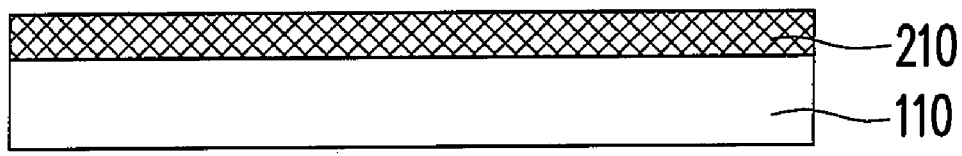

Referring to FIG. 2B, a pixel array 210 is then formed on the substrate 110, and the pixel array 210, for example, includes a plurality of scan lines, a plurality of data lines, a plurality of active devices and a plurality of pixel electrodes. The method for forming the pixel array 210 is to utilize, for example, a plurality of thin film processes, photolithographic processes and etching processes. Since the thin film process, the photolithographic process and the etching process are common conventional techniques, and the details will not be described herein any more.

Figure 2C:
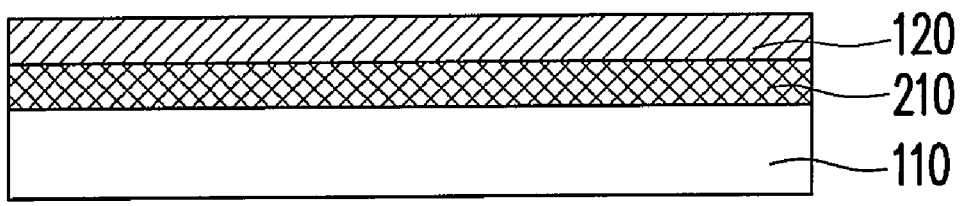

Referring to FIG. 2C, an auxiliary layer 120 is then formed on the pixel array 210. The method for forming the auxiliary layer 120 is, for example, spin coating or inkjet printing. The material and thickness of the formed auxiliary layer 120 are the same as those described above.

Figure 2D:
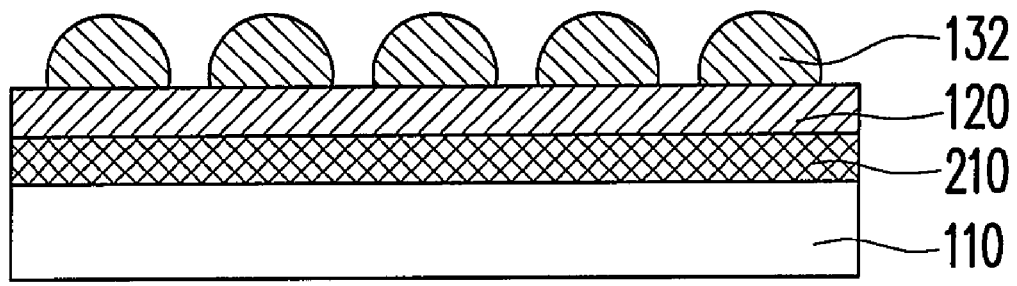

Referring to FIG. 2D, an alignment material solution 132 is then sprayed on the auxiliary layer 120 through an inkjet printing process. The alignment material solution 132 is the same as that described above.

Figure 2E:
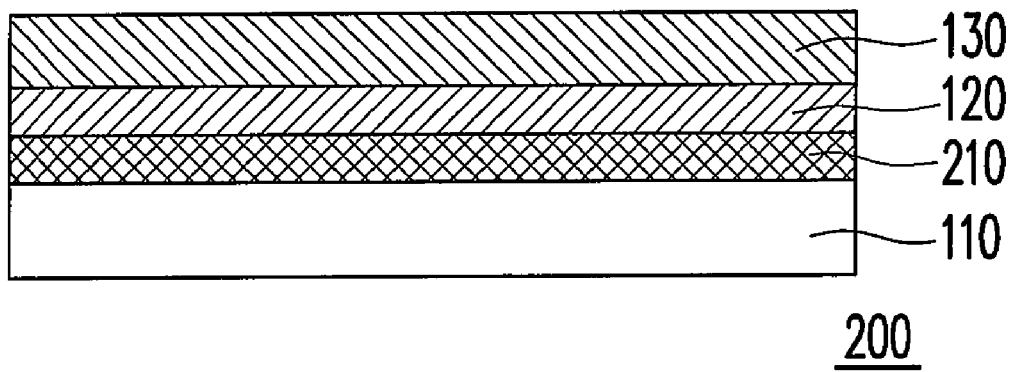

Referring to FIG. 2E, by performing a curing process, the alignment material solution 132 is cured to form an alignment layer 130. The curing process is, for example, a heat curing process, UV curing process or other suitable curing process.

After completing the above flow of FIG. 2A to FIG. 2E, an active device array substrate 200 is manufactured. It should be noted that the auxiliary layer 120 has already been formed on the pixel array 210 before forming the alignment layer 130, thus the recesses on the pixel array 210 can be filled by the auxiliary layer 120. Therefore, the alignment material solution 132 sprayed on the auxiliary layer 120 diffuses on a relatively smooth surface, thus forming an alignment layer 130 with preferred smoothness. Since the active device array substrate 200 has an alignment layer 130 with preferred smoothness, it may be further applied to assemble a liquid crystal display panel, so as to enhance the display quality of the liquid crystal display panel.

It also should be noted that, in the method for manufacturing the active device array substrate, the method for forming the auxiliary layer 120 also can be inkjet printing or other suitable method.

Figure 3A:
FIGS. 3A to 3E show a flow chart of a method for manufacturing a color filter substrate according to an embodiment of the present invention.

FIG. 3A to FIG. 3E show a flow chart of a method for manufacturing a color filter substrate according to an embodiment of the present invention. Referring to FIG. 3A, the method for manufacturing the color filter substrate includes providing a substrate 110 first. The substrate 110 is the same as that described above.

Figure 3B:
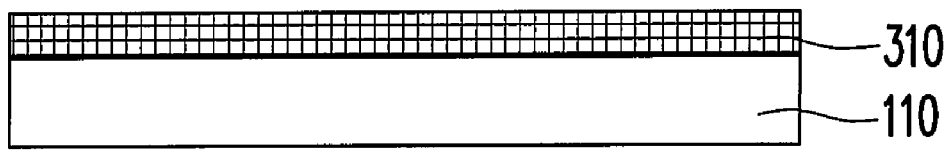

Referring to FIG. 3B, a color filter array 310 is then formed on the substrate 110, and the color filter substrate 310 includes, for example, a black matrix layer and a plurality of color filter patterns disposed, e.g., in the gaps formed by the black matrix layer. The method for forming the color filter array is, for example, utilizing a plurality of thin film processes, lithographic processes and etching processes, and the details will not be described herein any more.

Figure 3C:
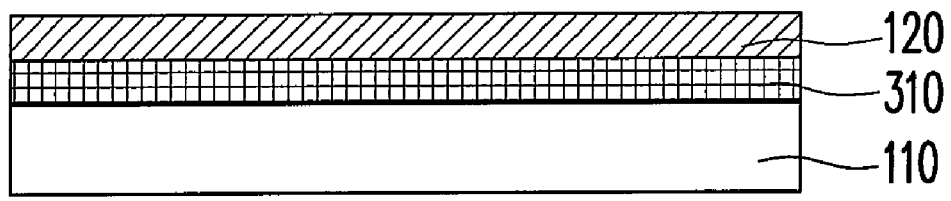

Referring to FIG. 3C, an auxiliary layer 120 is then formed on the color filter array 310. The method for forming the auxiliary layer 120 is, for example, spin coating or inkjet printing. The material and thickness of the formed auxiliary layer 120 are the same as those described above.

Figure 3D:
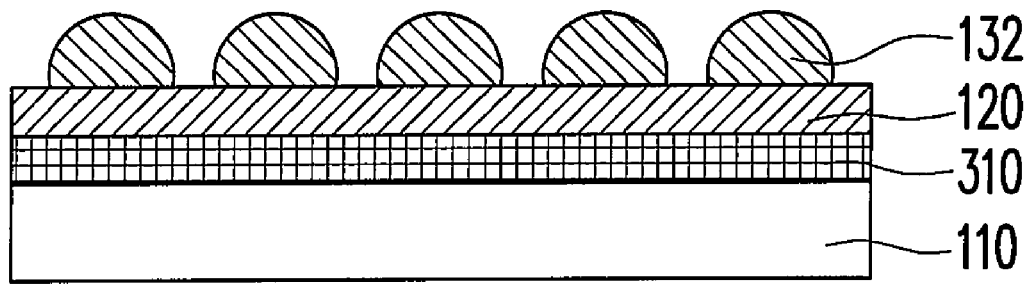

Referring to FIG. 3D, an alignment material solution 132 is then sprayed on the auxiliary layer 120 through an inkjet printing process. The alignment material solution 132 is the same as that described above.

Figure 3E:
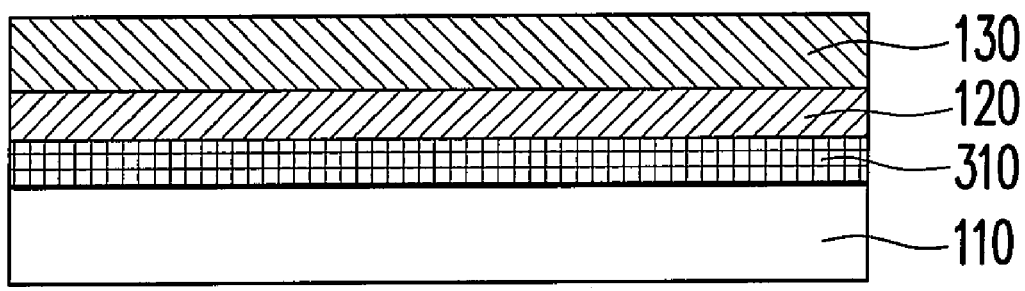

Referring to FIG. 3E, by performing a curing process, the alignment material solution 132 is cured to form an alignment layer 130. The curing process is, for example, a heat curing process, UV curing process or other suitable curing process. Thus, a color filter substrate 300 is manufactured.

Similar to the circumstance described above, an auxiliary layer 120 has already been formed on the color filter array 310 before forming the alignment layer 130, thus the recesses on the color filter array 310 are filled by the auxiliary layer 120. Therefore, the alignment material liquid 132 sprayed onto the auxiliary layer 120 diffuses on a relatively smooth surface, thus forming an alignment layer 130 with preferred smoothness after the curing process. The color filter substrate 300 can be applied to assemble a liquid crystal display panel, so as to enhance the display quality of the liquid crystal display panel.

To sum up, the methods for manufacturing the alignment layer, the active device array substrate and the color filter substrate provided by the present invention at least have the following advantages.

1. In the method for manufacturing the alignment layer, the active device array substrate and the color filter substrate provided by the present invention, an auxiliary layer is formed on the substrate before forming the alignment layer, such that the alignment material solution sprayed onto the auxiliary layer diffuses on a relatively smooth surface, thus forming an alignment layer with preferred smoothness.

2. The active device array substrate and the color filter substrate manufactured by using the method of the present invention have an alignment layer with preferred smoothness, and when they are used to assemble a liquid crystal display panel, the display quality of the liquid crystal display panel is enhanced.

3. The methods for manufacturing the alignment layer, the active device array substrate and the color filter substrate provided by the present invention are compatible with the current manufacturing process in the field, and thus no additional apparatuses are needed.

It will be apparent to those skilled in the art that various modifications and variations can be made to the structure of the present invention without departing from the scope or spirit of the invention. In view of the foregoing, it is intended that the present invention covers modifications and variations thereof provided they fall within the scope of the appended claims.

What is claimed is:

1. A method for manufacturing an alignment layer, comprising:
   providing a substrate;
   forming an auxiliary layer on the substrate;
   spraying an alignment material solution on the auxiliary layer through inkjet printing, wherein the alignment material solution includes an alignment material and a first solvent, and the auxiliary layer has the same polarity as the first solvent; and
   performing a curing process for curing the alignment material solution, so as to form an alignment layer.

2. The method of claim 1, wherein the material of the first solvent is one selected from the group consisting of r-Butyrolactone (r-BL), Butyl Cellosolve (BC), Dipropylene Glycol Monomethyl Ether (DPM), N-Methyl-2-pyrrolidone (NMP), and any combination thereof.

3. The method of claim 1, wherein the material of the auxiliary layer is one selected from the group consisting of r-BL, BC, DPM, NMP, and any combination thereof.

4. The method of claim 1, wherein the first solvent and the auxiliary layer are of the same material.

5. The method of claim 1, wherein forming the auxiliary layer comprises spin coating or inkjet printing.

6. The method of claim 1, wherein the thickness of the auxiliary layer falls within the range of 10 Å to 5 μm.

7. The method of claim 1, wherein the thickness of the auxiliary layer falls within the range of 100 Å to 1 μm.

8. A method for manufacturing an active device array substrate, comprising:
   providing a substrate;
   forming a pixel array on the substrate;
   forming an auxiliary layer on the pixel array;
   spraying an alignment material liquid on the auxiliary layer through inkjet printing, wherein the alignment material solution includes an alignment material and a first solvent, and the auxiliary layer has the same polarity as the first solvent; and
   performing a curing process for curing the alignment material solution, so as to form an alignment layer.

9. The method of claim 8, wherein the material of the first solvent is one selected from the group consisting of r-BL, BC, DPM, NMP, and any combination thereof.

10. The method of claim 8, wherein the material of the auxiliary layer is one selected from the group consisting of r-BL, BC, DPM, NMP, and any combination thereof.

11. The method of claim 8, wherein the first solvent and the auxiliary layer are of the same material.

12. The method of claim 10, wherein the auxiliary layer is a composite material layer, and the weight ratio of r-BL, BC, DPM and NMP is a: b: c: d, and $a+b+c+d=100$, $0 \leq a \leq 100$, $0 \leq b \leq 100$, $0 \leq c \leq 100$, $0 \leq d \leq 100$.

13. The method of claim 8, wherein forming the auxiliary layer comprises spin coating or inkjet printing.

14. The method of claim 8, wherein the thickness of the auxiliary layer falls within the range of 10 Å to 5 μm.

15. The method of claim 14, wherein the thickness of the auxiliary layer falls within the range of 100 Å to 1 μm.

16. A method for manufacturing a color filter substrate, comprising:
   providing a substrate;
   forming a color filter array on the substrate;
   forming an auxiliary layer on the color filter array;
   spraying an alignment material solution on the auxiliary layer through inkjet printing, wherein the alignment material solution includes an alignment material and a first solvent, and the auxiliary layer has the same polarity as the first solvent; and
   performing a curing process for curing the alignment material solution, so as to form an alignment layer.

17. The method of claim 16, wherein the material of the first solvent is one selected from the group consisting of r-BL, BC, DPM, NMP, and any combination thereof.

18. The method of claim 16, wherein the material of the auxiliary layer is one selected from the group consisting of r-BL, BC, DPM, NMP, and any combination thereof.

19. The method of claim 16, wherein the first solvent and the auxiliary layer are of the same solvent.

20. The method of claim 18, wherein the auxiliary layer is a composite material layer, and the weight ratio of r-BL, BC, DPM and NMP is a: b: c: d, and $a+b+c+d=100$, $0 \leq a \leq 100$, $0 \leq b \leq 100$, $0 \leq c \leq 100$, $0 \leq d \leq 100$.

21. The method of claim 16, wherein forming the auxiliary layer comprises spin coating or inkjet printing.

22. The method of claim 16, wherein the thickness of the auxiliary layer falls within the range of 10 Å to 5 μm.

23. The method of claim 16, wherein the thickness of the auxiliary layer falls within the range of 100 Å to 1 μm.

* * * * *